Mar. 13, 1923.
A. N. CHRISTIANSEN
SEPARATOR
Filed May 31, 1921
1,448,482
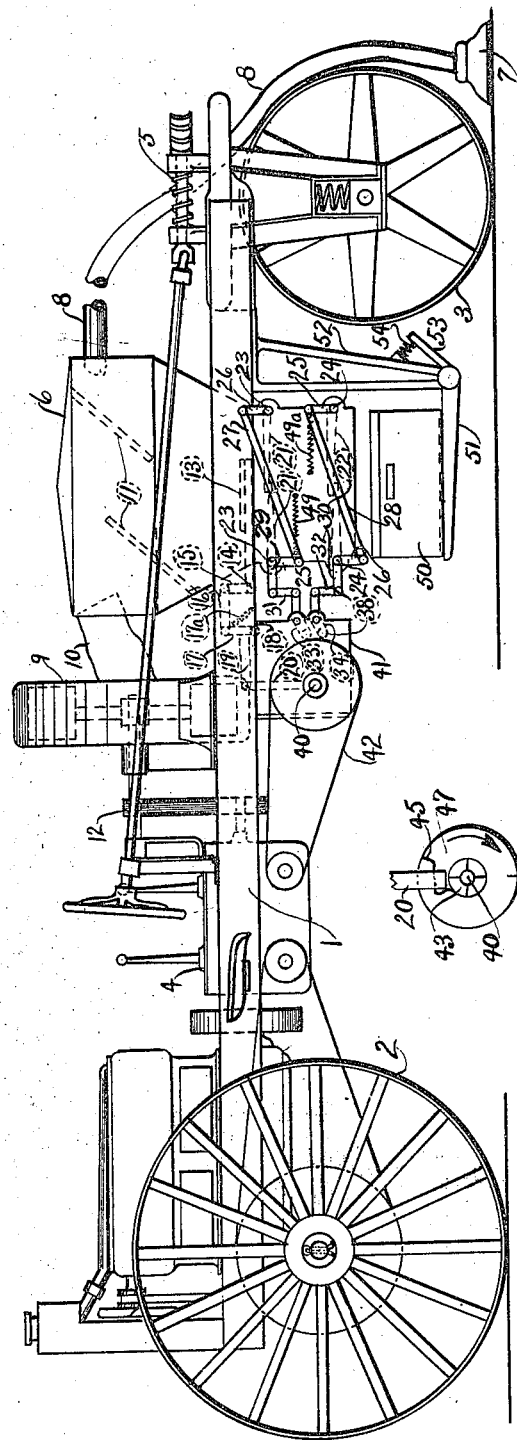
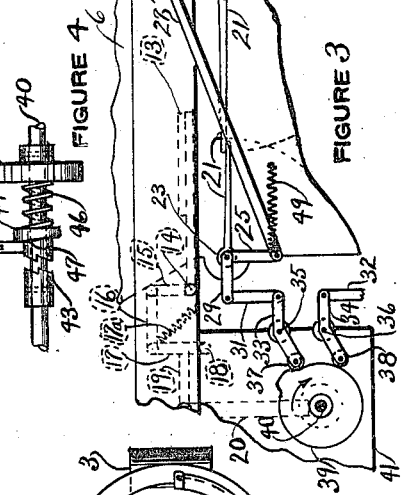
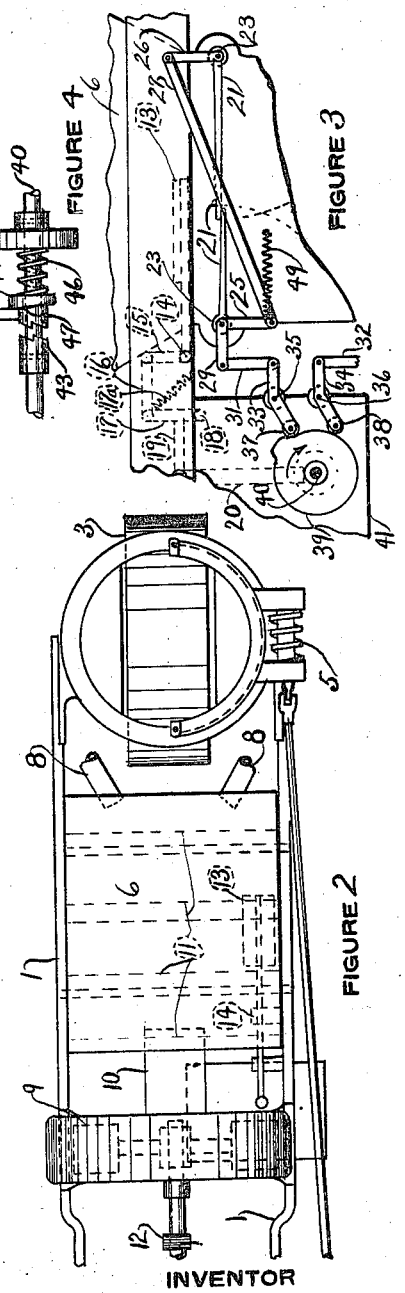
INVENTOR
BY ATTORNEY Patented Mar. 13, 1923.  1,448,482

UNITED STATES PATENT OFFICE.

AMO N. CHRISTIANSEN, OF CUPERTINO, CALIFORNIA.

SEPARATOR.

Application filed May 31, 1921. Serial No. 473,751.

*To all whom it may concern:*

Be it known that I, AMO N. CHRISTIANSEN, a citizen of the United States, and a resident of Cupertino, in the county of Santa Clara and State of California, have invented certain new and useful Improvements in Separators, of which the following is a specification.

My invention relates to a machine for picking prunes from the ground by means of suitably mounted suction nozzles.

It is the object of my invention to provide a machine whereby nuts and fruits may be gathered into a receiver by induced air currents, there separated from dust and debris and deposited in suitable boxes. It is a further object to provide certain mechanisms for the above machine whereby the fruit and debris are properly separated and whereby the fruit is automatically weighed and deposited in boxes without materially interfering with the operation of the air suction mechanism. It is still a further object to provide a means whereby the filled boxes may be automatically removed from the machine.

In the drawings:—

Figure 1 is a side elevation of my improved prune picker, part broken away.

Figure 2 is a plan view of the forward portion of the same, part broken away.

Figure 3 is an enlarged detail of a portion of the dumping mechanism.

Figure 4 is a detail of the clutch for operating the dumping mechanism.

Figure 5 is an elevation of the clutch controlling cam.

Referring more particularly to the drawing, 1 indicates the framework of a vehicle mounted on rear wheels 2 and steering wheels 3, the general operating mechanism being indicated at 4 and the steering mechanism at 5. Mounted on frame 1 is a weighing and separating chamber 6 having one or more suction nozzles 7 connected thereto by flexible pipes 8. At 9 is shown an exhauster fan mounted on frame 1 adjacent chamber 6 and connected thereto by pipe 10, baffle plates 11 being arranged in chamber 6 to first deflect the entering material downwardly and then upwardly whereby the prunes are more readily separated from the lighter material. The fan 9 is, of course operated by a driving mechanism as 12 connected to the power plant of the machine.

It is necessary to discharge the prunes from the chamber 6 when a certain quantity has collected therein without materially interrupting the action of the nozzles. To accomplish this result I provide the following mechanism.

At 13 is an arm arranged in the lower portion of chamber 6 to receive fruit deposited therein and pivoted at 14. Mounted on arm 13 at its pivotal point is an arm 15 to which is connected a link 16 attached to an arm 17 pivoted at 18, the arm 17 having a finger 19 mounted thereon engaging a pin 20, this mechanism forming a tripping mechanism for the discharge gates hereinafter described.

Below arm 13 the chamber empties into a discharge chute closed by two sets of doors as at 21—21 and 22—22 hinged at 23—23 and 24—24 respectively and carrying arms as 25—25 and 26 respectively. Each pair of arms 25 and 26 are oppositely directed and connected by links as 27 and 28 so that the operation of one arm 25 and 26 will automatically operate the other arm 25 and 26 to the same degree thereby simultaneously opening and closing the two doors of each pair. One arm 25 and one arm 26 has an extension thereon as at 29 and 30 respectively, connected to links 31 and 32 which are in turn attached to arms 33 and 34 pivoted as at 35 and 36. On the end of arms 33 and 34 are rollers 37 and 38 adapted to engage a cam 39, on shaft 40. Shaft 40 is journaled in casing 41 and operated by a belt 42 or other suitable connection to the power mechanism of the device. On shaft 40 is arranged a jaw clutch 43 normally held out of engagement by pin 20 engaging a cam 44 on said shaft. Cam 44 is so formed that upon lifting pin 20 a distance as 45 through the medium of arms 13—15—16—17 and 19 the clutch is thrown into operation by spring 46, but upon the cam 44 revolving a distance in the direction indicated by the arrow the pin rides up on shoulder 47 and releases the clutch.

The result of this construction is, that when sufficient fruit falls upon arm 13 to unbalance it the pin 20 is retracted a distance and the clutch thrown into engagement thereby causing cam 39 to revolve in the direction indicated by the arrow. The revolving cam first engages arm 33 and thereby opens doors 21—21 and allows the fruit thereon to fall upon the doors 22—22. The weight of the fruit has now been taken off the gate 13 which is again raised by spring 17ª acting through arms 15—16. At the same time pin 20 has been lowered to its normal position on cam 44 as shown in Figure 5. The moment, however, that the cam 39 releases arm 33 the doors 21—21 are snapped shut by spring 49 and the cam 39 engages arm 34 and operates doors 22—22 which are closed by spring 49ª. The clutch is now released by the operation of cam surface 47 against pin 20 and cam 39 remains stationary until again put into operation through the operating arm 13.

Immediately below doors 22—22 is arranged a box 50 on platform 51, the latter being pivotally mounted upon a supporting framework 52 secured to the frame of the machine and normally held in a horizontal position by means of arms 53 engaging spring 54 inserted between the said arms and framework. Upon the depositing of a sufficient amount of fruit therein the box depresses platform 51 and slides off of the same on to the ground as the machine moves forward. When the box is deposited on the ground the spring 54 returns the platform to a horizontal position ready for another box.

With a device constructed and operated as above set forth any desired number of nozzles may be operated over the ground, the dust, leaves, twigs, etc., being effectively separated from the fruit in the chamber 6. The fruit gathered in the chamber is automatically removed therefrom and deposited in boxes without materially interrupting the action of the nozzles and exhaust chamber, since the upper set of doors is closed before the lower one is opened.

It must now be seen that I have provided a simple and highly efficient means for rapidly removing fruit from the ground and depositing it in boxes without injury thereto.

It must be understood of course, that changes in form, construction and method of operation may be made within the scope of the appended claims.

I claim:—

1. In a device of the character indicated including a motor vehicle having a separator chamber mounted thereon, two pairs of doors arranged one over the other and pivotally mounted to close the bottom of said chamber, a shaft operated by the power plant of said vehicle, a cam arranged on said shaft, cam operated means for successively opening said pairs of doors, means for successively closing said pairs of doors, and means for rendering said cam alternately operative and inoperative.

2. In a device of the character indicated including a motor vehicle having a separated chamber mounted thereon, two pairs of doors arranged one over the other and mounted to meet in the center of said chamber and close the same, a shaft operated by the power plant of said vehicle, a cam arranged on said shaft, cam operated means for successively opening said pairs of doors, means for successively closing said pairs of doors, and means for rendering said cam alternately operative and inoperative.

3. In a device of the character indicated including a motor vehicle having a separator chamber mounted thereon, a pair of doors pivotally mounted at the sides of said chamber to meet in the center and close the bottom thereof, a second pair of doors pivotally mounted at the sides of said chamber below said first mentioned doors and meeting in the center thereof, an arm pivotally mounted in said chamber above said doors to receive material deposited thereon and movable under a given weight of material, and means rendered operative by the movement of said arm for alternately opening and closing said pairs of doors.

4. In a device of the character indicated including a motor vehicle having a separator chamber mounted thereon, a pair of doors pivotally mounted to close the bottom of said chamber, a shaft operated by the power plant of said vehicle, a cam arranged on said shaft, cam operated means for opening said pair of doors, means for closing said doors, and means for rendering said cam alternately operative and inoperative.

5. In a device of the character indicated including a motor vehicle having a separator chamber mounted thereon, a pair of doors pivotally mounted to close the bottom of said chamber, a shaft operated by the power plant of said vehicle, a cam arranged on said shaft, cam operated means for opening said pair of doors, means for closing said doors, and means actuated by the weight of material in said chamber for rendering said cam operative.

6. In a device of the character indicated including a motor vehicle having a separator chamber mounted thereon, a pair of doors pivotally mounted to close the bottom of said chamber, a shaft operated by the power plant of said vehicle, a clutch arranged on said shaft, normally in an inoperative position, a cam arranged on said shaft and rendered operative by said clutch, cam operated means for opening said pair of doors, means for closing said doors, an arm mounted in said chamber above said doors to receive material deposited therein, a second cam arranged on said shaft and forming a part of said clutch, a pin operatively mounted with relation to said last named cam, and mechanism connecting said pin and arm whereby a weight on said arm will retract said pin and release said clutch to render said first named cam operative.

AMO N. CHRISTIANSEN.